United States Patent [19]

McNaught et al.

[11] Patent Number: 4,930,676
[45] Date of Patent: Jun. 5, 1990

[54] JOINT BETWEEN ARTICLES OF MATERIALS OF DIFFERENT COEFFICIENTS OF THERMAL EXPANSION

[75] Inventors: William G. McNaught, Broughty Ferry; Roger Hill, Silverburn, both of Scotland

[73] Assignee: Ferranti International PLC, United Kingdom

[21] Appl. No.: 870,301

[22] Filed: May 23, 1986

Related U.S. Application Data

[63] Continuation of Ser. No. 564,907, Dec. 23, 1983, abandoned.

[30] Foreign Application Priority Data

Dec. 23, 1982 [GB] United Kingdom ............... 8236600

[51] Int. Cl.⁵ .............................................. B23K 21/00
[52] U.S. Cl. ...................................... 228/115; 228/121
[58] Field of Search ................ 228/3.1, 115, 120, 121, 228/122, 24, 236; 156/312; 264/60, 120

[56] References Cited

U.S. PATENT DOCUMENTS

| | | | |
|---|---|---|---|
| 2,709,147 | 5/1955 | Ziegler | 228/121 |
| 2,984,759 | 5/1961 | Vine | 228/115 |
| 3,235,943 | 2/1966 | Marafioti | 228/121 |
| 3,405,207 | 10/1968 | Vahldiek | 264/120 |
| 3,590,467 | 7/1971 | Chase | 228/121 |
| 3,634,934 | 1/1972 | Fitzgerald | 228/3.1 |
| 3,671,618 | 6/1972 | Huber | 264/120 |
| 3,698,620 | 10/1972 | Geyer | 228/3.1 |
| 3,715,070 | 2/1973 | Shibata | 228/3.1 |
| 3,754,674 | 8/1973 | Wesoloski | 228/122 |
| 3,777,281 | 12/1973 | Hochuli | 228/121 |
| 3,999,698 | 12/1976 | Conklin | 228/115 |
| 4,047,658 | 9/1977 | Frueauff | 228/115 |
| 4,073,848 | 2/1978 | Kuehn | 264/120 |
| 4,159,075 | 6/1979 | Ljung | 228/116 |
| 4,273,581 | 6/1981 | Inoue | 264/120 |
| 4,382,053 | 5/1983 | Rigby | 264/120 |
| 4,473,526 | 9/1984 | Bühler | 264/120 |

FOREIGN PATENT DOCUMENTS

| | | |
|---|---|---|
| 0610640 | 6/1978 | U.S.S.R. ............................ 228/236 |
| 759200 | 10/1956 | United Kingdom . |
| 780012 | 7/1957 | United Kingdom . |
| 890455 | 1/1959 | United Kingdom . |
| 808766 | 2/1959 | United Kingdom . |
| 826823 | 1/1960 | United Kingdom . |
| 845112 | 8/1960 | United Kingdom . |
| 846864 | 8/1960 | United Kingdom . |
| 849479 | 9/1960 | United Kingdom . |
| 1143535 | 2/1969 | United Kingdom . |
| 1389542 | 4/1975 | United Kingdom . |
| 1426873 | 3/1976 | United Kingdom . |
| 2041635A | 9/1980 | United Kingdom . |
| 2095604A | 10/1982 | United Kingdom . |

*Primary Examiner*—Kurt Rowan
*Assistant Examiner*—Gloria Norris
*Attorney, Agent, or Firm*—Kerkam, Stowell, Kondracki & Clarke

[57] ABSTRACT

A method of providing a joint between articles of materials of different coefficients of thermal expansion comprises providing a preform of Indium between the articles, and, at ambient temperature, applying pressure to the articles to compress the Indium therebetween, the pressure being applied in a cyclical manner. A satisfactory joint is provided without employing complex cleaning of the co-operating surfaces of the constituent parts of the joint.

4 Claims, No Drawings

JOINT BETWEEN ARTICLES OF MATERIALS OF DIFFERENT COEFFICIENTS OF THERMAL EXPANSION

This is a continuation of application Ser. No. 564,907, filed Dec. 23, 1983, abandoned.

THIS INVENTION relates to joints between articles of materials of different coefficients of thermal expansion, for example, relating to seals between two glass or ceramic articles, or between a glass, or ceramic, article and a metal article.

One of the articles may be of a glass ceramic; and the other article, to be joined thereto, may be of a Nickel-Iron alloy.

It is usually required that the joint provided is mechanically strong; and usually, but not essentially, the joint is required to provide an hermetic seal between the two articles.

It is desirable that such a joint is able to accommodate any differential thermal expansion between the materials of the articles joined together thereby. It is known for such a joint to include the malleable metal Indium. It is an object of the present invention to provide a novel and advantageous method of providing such a joint.

According to the present invention a method of providing a joint between articles of materials of different coefficients of thermal expansion comprises placing Indium, at least substantially free from impurities, between uncoated surfaces of the articles, which article surfaces are required to be joined together, and are at least substantially free from impurities, and applying pressure to the articles, at ambient temperature, and in a cyclical manner, in order to compress the Indium therebetween, and in order to provide the required joint.

The maximum pressure may be applied for approximately 20 seconds.

Conveniently, the applied pressure may vary between the maximum applied pressure, and approximately half this value, in a cyclical manner.

The maximum applied pressure may be approximately $15.5 \times 10^6$ Newtons per square meter.

The present invention will now be described by way of example.

EXAMPLE

An article of a glass ceramic, having a low coefficient of linear expansion of $0.03 \times 10^{-6}$ per degree Kelvin at 20° C., is cleaned and degreased in any known way. A second article of a Nickel-Iron alloy, having a low coefficient of linear expansion of less than $1 \times 10^{-6}$ per degree Kelvin at 20° C., also is cleaned and degreased in any known way.

After keeping the two articles clean, the articles are assembled in a jig, with a preform of Indium, of wire 1 millimeter in diameter, held between the surfaces of the articles to be joined together. The required Indium preform is produced immediately before the articles are to be joined together, so that there is no surface oxide film on the Indium preform.

Under ambient conditions, or in any atmosphere which is required to be enclosed between the two articles. A maximum possible pressure of approximately $15.5 \times 10^6$ Newtons per square meter is applied to the articles, the time taken to apply such a pressure being approximately 20 seconds. The pressure is then reduced to half the maximum applied pressure, before the maximum pressure is applied again for approximately 20 seconds. This cycle is repeated two or three times. In this manner, the required joint is formed between the two articles. The joint is mechanically strong, on a joint of 1.3 square centimeters, the breaking force being 17,000,000 Newtons, but the malleability of the Indium ensures that the joint is able to accomodate any differential thermal expansion between the materials of the articles. An hermetic seal is provided between the two articles.

The Indium does not alloy with the materials of the articles under the conditions pertaining for a process in accordance with the present invention, although the materials may be capable of alloying under other conditions.

Such a method, in accordance with the present invention, of providing a joint between the two articles, is advantageous because it does not require heat to be applied; and can be formed under ambient conditions, or in any desired atmosphere.

Further, the complexity of the method is less than for at least some known methods of forming such joints, because the cleaning process steps employed are less complex, and the co-operating surfaces of the constituent parts of the assembly from which the joint is formed do not require any special treatments. Whilst the co-operating surfaces of the articles are required to be at least substantially planar, a satisfactory joint can be provided between scratched surfaces with the method in accordance with the present invention. If the seal provided by such a joint inadvertently is broken, it may be repaired by repeating the method in accordance with the present invention upon the joint.

The joint may be between more than two articles; and the articles may be of more than two materials.

Such a joint may be provided in relation to articles of other materials than those described above, the materials of the articles associated with each such joint having different coefficients of thermal expansion, for example, the joint being between two glass, or ceramic, or metal articles, or an article wholly of glass or ceramic material and a metal article. The ceramic may be silica or alumina. The metal may be brass, copper, aluminium, steel, gold or silver.

Various modifications of the method described above are possible.

The maximum pressure required to be applied varies with the materials of the articles to be joined together. For example, for a gold article and a ceramic article the maximum pressure being $8 \times 10^6$ Newtons per square meter. Otherwise when one article is of metal the maximum pressure is in the range 13 to $18 \times 10^6$ Newtons per square meter. In addition, for any particular combination of materials of the articles to be joined together, if the maximum applied pressure is less than the maximum pressure required to be applied, whilst a satisfactory, mechanically strong, joint may be provided, such a joint may not provide an hermetic seal between the articles, which may be acceptable.

What we claim is:

1. A method of providing a joint between articles of materials of different coefficients of thermal expansion, comprising placing a preform of indium, produced immediately before providing said joint such that it is at least substantially free from impurities, between uncoated surfaces of the articles, which article surfaces are required to be joined together, the otherwise untreated surfaces being at least substantially free from impurities, and, at ambient temperature, applying the necessary maximum pressure to compress the indium between the surfaces, and then at least twice reducing and reapplying the maximum pressure whereby a mechanically strong joint is obtained.

2. A method as claimed in claim 1 in which the maximum pressure is applied for approximately 20 seconds.

3. A method as claimed in claim 1 in which the maximum applied pressure is approximately $15.5 \times 10^6$ Newtons per square meter.

4. A method as claimed in claim 1 in which the applied pressure varies between the maximum applied pressure, and approximately half this value.

* * * * *